: 3,089,887
THIOCARBAMIC ESTERS
Jean Metivier, Arpajon, France, assignor to Société des Usines Chimiques Rhone-Poulenc, Paris, France, a French body corporate
No Drawing. Filed Dec. 13, 1960, Ser. No. 75,472
Claims priority, application France Dec. 15, 1959
3 Claims. (Cl. 260—455)

This invention relates to new thiocarbamic esters, to processes for their preparation and compositions containing them.

According to the present invention, there are provided new thiocarbamic esters of the general formula:

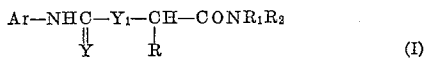
(I)

wherein Ar represents an aryl group, preferably a phenyl or naphthyl group, which may be substituted by one or more members of the class consisting of halogen atoms and lower alkyl, lower alkoxy, lower alkenyloxy, lower alkylthio, lower alkoxycarbonyl, lower alkanesulphonyl, nitro and trifluoromethyl groups, Y and $Y_1$ each represent an oxygen or sulphur atom, at least one being a sulphur atom, R represents a hydrogen atom or a methyl group, and $R_1$ and $R_2$ are the same or different and each represents a hydrogen atom or a lower alkyl group or $R_1$ and $R_2$ together with the nitrogen atom to which they are attached collectively represent a mononuclear five- or six-membered heterocylic ring which may include a second hetero atom, such as oxygen. By the word "lower" as applied in this specification and in the appended claims to any organic group is meant that the group in question contains not more than 4 carbon atoms.

Those compounds of general Formula I where R represents a methyl group can exist in optically active forms as the carbon atom to which the group is attached is an asymmetric carbon atom. The invention includes within its scope the racemates as well as the corresponding optically active isomers of such compounds.

According to a feature of the invention, these new esters are obtained by reacting an aryl isocyanate or isothiocyanate of the formula AR—NCY with an amide of the general formula:

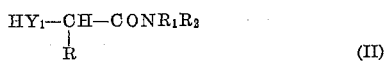
(II)

wherein the various symbols are as hereinbefore defined. The reaction is preferably carried out in an inert organic solvent medium, preferably an aromatic hydrocarbon such as benzene, and at a temperature between 15° and 150° C.

According to a further feature of the invention, the esters of general Formula I in which Y and $Y_1$ both represent sulphur atoms are prepared by reacting a dithiocarbamate of the formula:

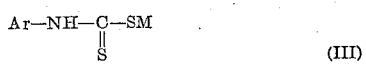
(III)

(wherein M represents an alkali metal atom, such as a sodium or potassium atom, or the ammonium ($NH_4$) group, and Ar is as hereinbefore defined) with a compound of the general formula:

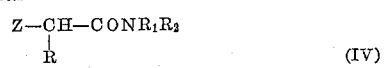
(IV)

wherein Z represents the acid residue of a reactive ester such as a halogen atom or a sulphuric or sulphonic ester residue, in particular methanesulphonyloxy or toluene-p-sulphonyloxy, and the other symbols are as hereinbefore defined. The reaction may be carried out in an aqueous or inert organic solvent medium at a temperature between 15° and 150° C. As organic solvent there may be employed a lower aliphatic alcohol, such as methanol or ethanol, a lower aliphatic ketone such as acetone or methylethyl ketone, or an aromatic hydrocarbon such as benzene or toluene.

In the case of esters of Formula I where R represents a methyl group, optically active isomers may be obtained by using optically active starting materials of Formula II or IV in the aforesaid processes, or by resolution in manner known per se of racemic products.

The new thiocarbamic esters of general Formula I have remarkable fungicidal properties. Those in which one of Y and $Y_1$ represents a sulphur atom and the other represents oxygen are active, in particular, against mildew on the potato, anthracnose in the French bean and apple- and pear-scab. Those compounds in which Y and $Y_1$ both represent sulphur atoms are active, in particular, against *Aspergillus niger*, *Penicillium italicum* and *Candida albicans*; they are also excellent nematocides. Compounds of importance are those of general Formula I wherein Ar represents a phenyl or naphthyl group unsubstituted or substituted by one or more halogen atoms or lower alkyl, lower alkoxy, lower alkenyloxy or lower alkylthio groups and, in particular, those in which $R_1$ represents a hydrogen atom or a methyl group, and $R_2$ represents a methyl or ethyl group. Of outstanding importance are 2 - (4 - methoxyphenylcarbamoylthio) - N - methylacetamide and 2 - (4 - allyloxyphenylcarbamoylthio)-N-methylacetamide.

According to another feature of the present invention, there are provided fungicidal and nematocidal compositions containing at least one thiocarbamic ester of general Formula I in association with one or more diluents compatible with the thiocarbamic ester or esters and suitable for use in fungicidal or nematocidal compositions. Preferably the compositions contain between 0.005 and 50% by weight of thiocarbamic ester. The compositions may be solid if there is employed a powdered solid compatible diluent such as talc, calcined magnesia, kieselguhr, tricalcium phosphate, powdered cork, absorbent carbon black or a clay such as kaolin or bentonite. Instead of a solid diluent, there may be used a liquid in which the thiocarbamic ester is dissolved or dispersed. The compositions may thus take the form of aerosols, suspensions, emulsions or solutions in organic or aqueous organic media, for example, aromatic hydrocarbons such as toluene or xylene or mineral, animal or vegetable oils, or mixtures of these diluents. The compositions in the form of dispersions, solutions or emulsions may contain wetting, dispersing or emulsifying agents of the ionic or non-ionic type, for example sulphoricinoleates, quaternary ammonium derivatives or products based on condensates of ethylene oxide, such as the condensates of ethylene oxide with octylphenol or p-isopropylphenol, or fatty acid esters of anhydrosorbitols which have been rendered soluble by etherification of the free hydroxyl groups by condensation with ethylene oxide. It is preferable to use agents of the non-ionic type because they are not sensitive to electrolytes. When emulsions are desired the thiocarbamic esters may be used in the form of self-emulsifying concentrates containing the active substance dissolved in the dispersing agent or in a solvent containing a dispersing agent compatible with the active ester and solvent, a simple addition of water producing compositions ready for use.

The solid compositions are preferably prepared by grinding the thiocarbamic ester with the solid diluent, or by impregnating the solid diluent with a solution of the thiocarbamic ester in a volatile solvent, evaporating the solvent and, if necessary, grinding the product so as to obtain a powder.

Fertilisers may be admixed with the aforesaid compounds and compositions.

For fungicidal or nematocidal purposes the active substances may be employed in dosages varying within relatively wide limits but dosages corresponding to a quantity of from 100 to 300 g. of active substance per hectare are generally suitable.

The following examples illustrate the invention.

*Example I*

To a solution of phenyl isocyanate (23.8 g.) in anhydrous benzene (50 cc.) is added a solution of N-methylthiolactamide (24.6 g.) in benzene (25 cc.). The mixture is allowed to stand for 12 hours at 20° C. and then heated for 1 hour at 50–55° C. After cooling, there is obtained 2-phenyl-carbamoylthio-N-methylpropionamide (36 g.), M.P. 122° C. On recrystallisation from benzene, the melting point remains unchanged.

*Example II*

To a solution of 4-chlorophenyl isocyanate (20 g.) in benzene (10 cc.) is added a solution of N-methylthiolactamide (16 g.) in benzene (20 cc.) and the mixture is heated under reflux for 4 hours. After cooling, a precipitate forms which is recrystallised from benzene (60 cc.). 2 - (4-chlorophenylcarbamoylthio)-N-methylpropionamide (19.5 g.), M.P. 142–143° C., is thus obtained.

*Example III*

To a solution of 3-chlorophenyl isocyanate (12.5 g.) in benzene (10 cc.) is added a solution of N-methylthiolactamide (10 g.) in benzene (10 cc.). The mixture is allowed to stand for 1 hour at room temperature and then refluxed for 1 hour. After cooling, a precipitate is collected which is recrystallised from benzene (40 cc.). 2 - (3 - chlorophenylcarbamoylthio)-N-methylpropionamide (16.5 g.), M.P. 125° C., is obtained.

*Example IV*

To a solution of 3,4-dichlorophenyl isocyanate (31.5 g.) in benzene (50 cc.) is added a solution of N-methylthiolactamide (20.6 g.) in benzene (25 cc.). The mixture is maintained at room temperature for 1 hour, and thereafter heated under reflux for the same time. The precipitate obtained on cooling is recrystallised from a mixture of benzene (180 cc.) and ethanol (60 cc.). There is thus obtained 2-(3,4-dichlorophenylcarbamoylthio)-N-methylpropionamide (34 g.), M.P. 170° C.

*Example V*

To a solution of 3-methylphenyl isocyanate (10.3 g.) in benzene (20 cc.) is added a solution of N-methylthiolactamide (9.6 g.) in benzene (10 cc.). The mixture is left at room temperature for 1 hour and then heated under reflux for a hour. On cooling, a precipitate is formed which melts at 119° C. after recrystallisation from benzene. Analysis of the product shows that it is 2-(3-methylphenylcarbamoylthio)-N-methylpropionamide.

*Example VI*

To a solution of 4-ethoxyphenyl isocyanate (16.3 g.) in benzene (50 cc.) is added gradually 4-thioglycolloylmorpholine (16.8 g.) and the mixture is heated under reflux for 8 hours. The solid which precipitates after cooling is dissolved in boiling ethanol (400 cc.). On cooling, there is obtained 4-S-(4-ethoxyphenylcarbamoyl)thioglycolloylmorpholine (20 g.), M.P. 149° C.

*Example VII*

To a solution of 3-chlorophenyl isocyanate (15.3 g.) in benzene (50 cc.) is aded 4-thioglycolloylmorpholine (16.8 g.) in benzene (25 cc.) and the mixture is heated under reflux for 8 hours. The precipitate obtained by cooling is recrystallised from boiling ethanol (220 cc.). After drying, there is obtained 4-S-(3-chlorophenylcarbamoyl)thioglycolloylmorpholine (19 g.) melting at 154–155° C.

By proceeding in a similar manner and starting with appropriate phenyl isocyanates and amides of the formula

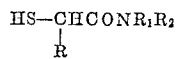

there were obtained the following products:

2-(4-methylphenylcarbamoylthio)-N-methylacetamide, M.P. 171° C.;
2-(2-methoxyphenylcarbamoylthio)-N-methylacetamide, M.P. 105° C.;
2-(3,4-dichlorophenylcarbamoylthio)-N-methylacetamide, M.P. 144° C.;
2-(2,5-dichlorophenylcarbamoylthio)-N-methylacetamide, M.P. 165° C.;
2-(3-methoxyphenylcarbamoylthio)-N-methylacetamide, M.P. 128° C.;
2-(4-methylthiophenylcarbamoylthio)-N-methylacetamide, M.P. 151° C.;
2-(4-ethylthiophenylcarbamoylthio)-N-methylacetamide, M.P. 145° C.;
2-(4-methoxyphenylcarbamoylthio)-N-methylacetamide, M.P. 144° C.;
2-(3,4-dichlorophenylcarbamoylthio)-N-dimethylacetamide, M.P. 186° C.;
2-(4-methoxyphenylcarbamoylthio)-N-dimethylacetamide, M.P. 163° C.
2-(2,5-dichlorophenylcarbamoylthio)-N-ethylacetamide, M.P. 158° C.;
2-(3-methoxyphenylcarbamoylthio)-N-ethylacetamide, M.P. 78° C.;
2-(4-methylphenylcarbamoylthio)-N-methylpropionamide, M.P. 138° C.;
2-(2,5-dichlorophenylcarbamoylthio)-N-methylpropionamide, M.P. 183° C.;
2-(3-methoxyphenylcarbamoylthio)-N-methylpropionamide, M.P. 130° C.;
2-(4-methylthiophenylcarbamoylthio)-N-methylpropionamide, M.P. 137° C.;
2-(4-methoxyphenylcarbamoylthio)-N-methylpropionamide, M.P. 128° C.;
2-(3,4-dichlorophenylcarbamoylthio)-N-ethylpropionamide, M.P. 140° C.;
2-(2,5-dichlorophenylcarbamoylthio)-N-ethylpropionamide, M.P. 166° C., and
2-(3-methoxyphenylcarbamoylthio)-N-ethylpropionamide, M.P. 118° C.

*Example VIII*

A mixture of 4-chlorophenyl isothiocyanate (16.9 g.) and N-methyllactamide (10.3 g.) is heated at 70–80° C. for 5 hours. After cooling, the pasty mass obtained is taken up in water (100 cc.) and ground in a mortar. On recrystallisation from ethanol, there is obtained 2-(4-chlorophenylthiocarbamoyloxy) - N - methylpropionamide (7 g.), M.P. 132° C.

*Example IX*

To a solution of N-methylthiolactamide (11.9 g.) in water (20 cc.) is added 4-ethoxyphenyl isothiocyanate (17.9 g.). After standing overnight at room temperature, the mixture is heated for 2 hours at 50° C. After removal of water by decantation, the product is taken up in ethanol (20 cc.) and ground in a mortar. The solid obtained is recrystallised from ethanol to give a product which analysis shows to be 2-(4-ethoxyphenyldithiocarbamoyl)-N-methylpropionamide (19 g.), M.P. 112° C.

*Example X*

By proceeding as in Example IX, but replacing the 4-ethoxyphenyl isothiocyanate by phenyl isothiocyanate, there is obtained 2-phenyldithiocarbamoyl-N-methylpropionamide (21 g.), M.P. 93–95° C.

Example XI

A mixture of ammonia (d=0.925, 92 cc.) and carbon disulphide (60 g.) is stirred rapidly and externally cooled to about 5° C. while aniline (46.5 g.) is added. At the end of 3 hours, the precipitate obtained is filtered off and dried in vacuo.

To the ammonium phenyldithiocarbamate obtained (84 g.) is added water (850 cc.). The resulting solution is poured on to a well agitated suspension of chloracetamide (41.2 g.) in water (400 cc.). After agitation for 3 hours at room temperature, the precipitate formed is filtered off and washed with iced water. After drying and crystallisation from ethanol, there is obtained 2-phenyldithiocarbamoylacetamide (24 g.), M.P. 102–104° C.

There are prepared in the same manner:

2-(4-chlorophenyldithiocarbamoyl)acetamide, M.P. 122–124° C.;
2-(3-chlorophenyldithiocarbamoyl)acetamide, M.P. 93–95° C., and
2-(4-ethoxyphenyldithiocarbamoyl)acetamide, M.P. 114° C.

Example XII

To a solution of 3-chlorophenyl isocyanate (19 g.) in benzene (25 cc.) is added N-methylthioglycollamide (13.5 g.) in benzene (75 cc.). The temperature of the reaction medium is maintained at about 40° C. After agitation for 3 hours at room temperature, the precipitate formed is filtered off and recrystallised from benzene. There is obtained 2-(3-chlorophenylcarbamoylthio)-N-methylacetamide (25.5 g.), M.P. 132° C.

The following products were prepared in a similar manner:

2-phenylcarbamoylthio-N-methylacetamide, M.P. 132° C.;
2-phenylcarbamoylthio-N-dimethylacetamide, M.P. 163° C.;
2-(4-chlorophenylcarbamoylthio)-N-methylacetamide, M.P. 179° C.;
2-(3-chlorophenylcarbamoylthio)-N-dimethylacetamide, M.P. 134° C.;
2-(3-chlorophenylcarbamoylthio)-N-ethylacetamide, M.P. 76° C.;
2-(3-methylphenylcarbamoylthio)-N-methylacetamide, M.P. 115° C.;
2-(4-ethoxyphenylcarbamoylthio)-N-methylacetamide, M.P. 159° C.;
2-(4-ethoxyphenylcarbamoylthio)-N-ethylacetamide, M.P. 157° C.;
2-(4-ethoxyphenylcarbamoylthio)-N-methylpropionamide, M.P. 140° C.;
2-(2-methoxyphenylcarbamoylthio)-N-methylpropionamide, M.P. 131° C.;
2-(3,4-dimethylphenylcarbamoylthio)-N-methylacetamide, M.P. 116° C.;
2-(3,4-dimethylphenylcarbamoylthio)-N-dimethylacetamide, M.P. 148° C.;
2-(3,4-dimethylphenylcarbamoylthio)-N-methylpropionamide, M.P. 160° C., and
2-(4-nitrophenylcarbamoylthio)-N-methylpropionamide, M.P. 203° C.

Example XIII

To a solution of 4-methylphenyl isocyanate (13.3 g.) in benzene (25 cc.) is added N-dimethylthioglycollamide (16.2 g.) in benzene (25 cc.). The temperature of the reaction medium is maintained at about 35° C. After agitation for 3 hours at room temperature, the precipitate formed is filtered off and taken up in boiling ethanol (525 cc.). On cooling, there is obtained 2-(4-methylphenylcarbamoylthio) - N - dimethylacetamide (20 g.), M.P. 178° C.

The following products were prepared by a similar manner:

2-(4-methylphenylcarbamoylthio)-N-ethylpropionamide, M.P. 140° C.;
2-(3-chloro-4-ethoxyphenylcarbamoylthio)-N-methylacetamide, M.P. 154° C.;
2-(3-chloro-4-ethoxyphenylcarbamoylthio)-N-methylpropionamide, M.P. 156° C.;
2-(3-chloro-4-ethoxyphenylcarbamoylthio)-N-ethylacetamide, M.P. 139° C.;
2-(3-chloro-4-methylphenylcarbamoylthio)-N-methylpropionamide, M.P. 167° C.;
2-(3-chloro-4-methylphenylcarbamoylthio)-N-ethylpropionamide, M.P. 127° C.;
2-(3-chloro-4-methylphenylcarbamoylthio)-N-dimethylacetamide, M.P. 160° C.;
2-(4-ethoxycarbonylphenylcarbamoylthio)-N-methylacetamide, M.P. 172° C.;
2-(4-ethoxycarbonylphenylcarbamoylthio)-N-ethylacetamide, M.P. 184° C.;
2-(4-ethoxycarbonylphenylcarbamoylthio)-N-ethylpropionamide, M.P. 146° C.;
2-(3-ethoxyphenylcarbamoylthio)-N-methylacetamide, M.P. 140° C.;
2-(3-ethoxyphenylcarbamoylthio)-N-methylpropionamide, M.P. 119° C.;
2-(3-ethoxyphenylcarbamoylthio)-N-ethylacetamide, M.P. 121° C.;
2-(3-ethoxyphenylcarbamoylthio)-N-ethylpropionamide, M.P. 119° C.;
2-(4-allyloxyphenylcarbamoylthio)-N-methylacetamide, M.P. 152° C.;
2-(4-allyloxyphenylcarbamoylthio)-N-methylpropionamide, M.P. 138° C.;
2-(4-allyloxyphenylcarbamoylthio)-N-ethylacetamide, M.P. 139° C.;
2-(4-allyloxyphenylcarbamoylthio)-N-ethylpropionamide, M.P. 127° C.;
2-(3-trifluoromethylphenylcarbamoylthio)-N-methylacetamide, M.P. 157° C.;
2-(3-trifluoromethylphenylcarbamoylthio)-N-methylpropionamide, M.P. 130° C.;
2-(3-trifluoromethylphenylcarbamoylthio)-N-ethylacetamide, M.P. 129° C.;
2-(4-methanesulphonylphenylcarbamoylthio)-N-methylacetamide, M.P. 179° C.;
2-(3-trifluoromethylphenylcarbamoylthio)-N-ethylpropionamide, M.P. 140° C.;
2-(4-methanesulphonylphenylcarbamoylthio)-N-ethylacetamide, M.P. 186° C.;
2-(3-chloro-4-methylphenylcarbamoylthio)-N-methylacetamide, M.P. 144° C.;
2-(3-chloro-4-methylphenylcarbamoylthio)-N-ethylacetamide, M.P. 110° C.;
2-(3-chloro-methoxyphenylcarbamoylthio)-N-methylacetamide, M.P. 164° C.;
2-(4-methoxyphenylcarbamoylthio)acetamide, M.P. 190° C., and
2-(4-ethoxycarbonylphenylcarbamoylthio)-N-methylpropionamide, M.P. 160° C.

Example XIV

To a solution of α-naphthyl isocyanate (15.2 g.) in benzene (20 cc.) is added N-methylthioglycollamide (9.82 g.) in benzene (20 cc.). The temperature of the reaction medium is maintained at about 40° C. After agitation for 3 hours at room temperature, the product is allowed to stand overnight. A precipitate forms, which is filtered off and taken up in boiling ethanol (1200 cc.). After cooling, there is obtained 2-(1-naphthylcarbamoylthio)-N-methylacetamide (20 g.), M.P. 194° C.

The following products were prepared by the same procedure:

2-(1-naphthylcarbamoylthio)-N-ethylacetamide, M.P. 148° C.;
2-(1-naphthylcarbamoylthio)N-ethylpropionamide, M.P. 180° C.;
2-(1-naphthylcarbamoylthio)-N-dimethylacetamide, M.P. 104° C., and
2-(1-naphthylcarbamoylthio)N-methylpropionamide, M.P. 176° C.

*Example XV*

To a solution of 4-chlorophenyl isothiocyanate (16.9 g.) in benzene (30 cc.) is added N-methylthiolactamide (11.9 g.) with agitation; a reaction occurs which is exothermic. Agitation is continued for 10 minutes, whereafter the reaction medium is cooled to about 15° C. The precipitate which forms is filtered off and, after recrystallisation from ethanol, there is obtained 2-(4-chlorophenyldithiocarbamoyl)-N-methylpropionamide (18 g.), M.P. 155° C.

*Example XVI*

To a solution of N-dimethylchloracetamide (24.2 g.) in water (200 cc.) is added over a period of 10 minutes a solution of ammonium 4-ethoxyphenyldithiocarbamate (46 g.) in water (1250 cc.). The temperature of the reaction mixture remains at about 30° C. After agitation for 3 hours at room temperature, the precipitate which is formed is filtered off and washed with water. After recrystallisation from ethanol, there is obtained 2-(4 - ethoxyphenyldithiocarbamoyl) - N - dimethylacetamide (31.5 g.), M.P. 126° C.

The following products were prepared in a similar manner:

2-phenyldithiocarbamoyl-N-dimethylacetamide, M.P. 134° C.;
2-(4-chlorophenyldithiocarbamoyl)-N-methylacetamide, M.P. 128° C.;
2-(4-chlorophenyldithiocarbamoyl)-N-dimethylacetamide, M.P. 130° C., and
2-phenyldithiocarbamoyl-N-methylacetamide, M.P. 106–108° C.

The following examples, in which parts are by weight, illustrate fungicidal compositions according to the invention. The compositions may be used, after dilution with water to give 0.005 to 50% by weight of thiocarbamic ester, to protect plants against cryptogamic diseases and fungi.

*Example XVII*

To 2 - (3 - chlorophenylcarbamoylthio) - N - methylpropionamide (20 parts) in cyclohexanone (160 parts) is added a condensate (20 parts) of ethylene oxide with p-isopropylphenol, the condensate containing 10 molecules of ethylene oxide per molecule of p-isopropylphenol.

*Example XVIII*

To 2 - (3 - methylphenylcarbamoylthio) - N - methylpropionamide (50 parts) is added kaolin (45 parts) and sodium dioctylsulphosuccinate (5 parts) whereafter the mixture is ground to a fine powder. The powder obtained is readily suspended in water.

*Example XIX*

A powder is obtained by grinding together 2-(4-methoxyphenylcarbamoylthio)-N-methylacetamide (50 g.) with talc (45 g.) and calcium lignosulphite (5 g.).

*Example XX*

To finely ground 2-(4-allyloxyphenylcarbamoylthio)-N-methylacetamide (20 g.) is added kaolin (70 g.) and sodium dodecylbenzenesulphonate (10 g.) and the mixture is ground to a powder.

The following example, in which parts are by weight, illustrate nematocidal compositions according to the invention.

*Example XXI*

To 2 - (4 - chlorophenyldithiocarbamoyl) - N - methylpropionamide (20 parts) in cyclohexanone (160 parts) is added a condensate (20 parts) of ethylene oxide with p-isopropylphenol, the condensate containing 10 molecules of ethylene oxide per molecule of p-isopropylphenol.

The composition before use may be diluted with water to give 0.005 to 10% by weight of dithiocarbamic ester.

We claim:
1. Thiocarbamic esters of the formula:

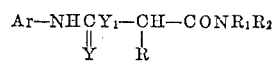

wherein Ar represents a member of the class consisting of the phenyl group, the naphthyl groups and phenyl groups substituted by at least one member of the class consisting of halogen atoms and lower alkyl, lower alkoxy, lower alkenyloxy, lower alkylthio, lower alkoxycarbonyl, lower alkanesulphonyl, nitro and trifluoromethyl groups, Y and $Y_1$ represent members of the class consisting of oxygen and sulphur atoms, at least one being a sulphur atom, R represents a member of the class consisting of a hydrogen atom and a methyl group, and $R_1$ and $R_2$, when individual groups, represent members of the class consisting of a hydrogen atom and a lower alkyl group and, when joined together, represent with the nitrogen atom to which they are attached a morpholine ring.

2. 2-(4 - methoxyphenylcarbamoylthio)-N-methylacetamide.

3. 2-(4 - allyloxyphenylcarbamoylthio)-N-methylacetamide.

References Cited in the file of this patent
UNITED STATES PATENTS 2,882,140    Searle                Apr. 14, 1959
2,891,065    Gundel               June 16, 1959